US010108874B2

(12) United States Patent
Petruk (10) Patent No.: US 10,108,874 B2
(45) Date of Patent: Oct. 23, 2018

(54) SYSTEMS AND METHODS FOR EVALUATING READINGS OF GAUGE DIALS

(71) Applicant: INTELLIGENT SECURITY SYSTEMS CORPORATION, Woodbridge, NJ (US)

(72) Inventor: Vladimir Petruk, Moscow (RU)

(73) Assignee: Intelligent Security Systems Corporation, Woodbridge, NJ (US)

( * ) Notice: Subject to any disclaimer, the term of this patent is extended or adjusted under 35 U.S.C. 154(b) by 0 days.

(21) Appl. No.: 15/694,265

(22) Filed: Sep. 1, 2017

(65) Prior Publication Data

US 2018/0253619 A1    Sep. 6, 2018

Related U.S. Application Data

(60) Provisional application No. 62/467,505, filed on Mar. 6, 2017.

(51) Int. Cl.
| | |
|---|---|
| *G06K 9/00* | (2006.01) |
| *G06K 9/46* | (2006.01) |
| *H04N 5/232* | (2006.01) |
| *G08B 21/18* | (2006.01) |

(Continued)

(52) U.S. Cl.
CPC ......... *G06K 9/4604* (2013.01); *G06K 9/6202* (2013.01); *G08B 21/182* (2013.01); *H04N 5/23296* (2013.01); *G06K 2209/03* (2013.01); *H04N 2005/2255* (2013.01)

(58) Field of Classification Search
CPC .......... G06K 9/00–9/82; G08B 21/182; H04N 5/23296
See application file for complete search history.

(56) References Cited

U.S. PATENT DOCUMENTS

| | | | | |
|---|---|---|---|---|
| 3,440,617 A | * | 4/1969 | Lesti .................... | G06K 9/00 382/224 |
| 5,673,331 A | * | 9/1997 | Lewis ................... | G06K 9/20 340/870.02 |
| 6,621,843 B2 | | 9/2003 | Yoo et al. | |

(Continued)

FOREIGN PATENT DOCUMENTS

| | | |
|---|---|---|
| JP | 2000-182021 A | 6/2000 |
| JP | 2011-081715 A | 4/2011 |
| JP | 2011-163856 A | 8/2011 |

OTHER PUBLICATIONS

Patentability Search Report, dated Dec. 1, 2016.
(Continued)

*Primary Examiner* — Sean Motsinger
(74) *Attorney, Agent, or Firm* — Eric L. Sophir; Dentons US LLP (57) ABSTRACT

A method includes identifying, by a processor, a gauge dial pattern in a first file based on a gauge dial template in a second file; identifying, by the processor, a needle pattern in the first file; generating, by the processor, a line pattern that approximates the needle pattern; determining, by the processor, a deflection angle of the needle pattern with respect to the gauge dial pattern based on the line pattern; converting, by the processor, the deflection angle into a reading of the gauge dial pattern based on the gauge dial template; and taking, by the processor, an action based on the reading.

20 Claims, 5 Drawing Sheets

(51) Int. Cl.
    *G06K 9/62*     (2006.01)
    *H04N 5/225*     (2006.01)

(56) References Cited

U.S. PATENT DOCUMENTS

| | | | |
|---|---|---|---|
| 6,845,177 B2 | 1/2005 | Chiu | |
| 8,411,896 B2 | 4/2013 | Sim | |
| 8,786,706 B2 | 7/2014 | Kennedy et al. | |
| 9,135,492 B2 * | 9/2015 | Gellaboina | G06K 9/00 |
| 2001/0055425 A1 * | 12/2001 | Chiu | G01D 5/39 |
| | | | 382/199 |
| 2007/0236366 A1 * | 10/2007 | Gur | G06K 9/00 |
| | | | 340/945 |
| 2009/0190795 A1 * | 7/2009 | Derkalousdian | G06K 9/00 |
| | | | 382/100 |
| 2016/0012312 A1 * | 1/2016 | Ishii | G06K 9/6204 |
| | | | 382/209 |
| 2016/0086034 A1 * | 3/2016 | Kennedy | G06K 9/342 |
| | | | 382/200 |
| 2017/0003189 A1 * | 1/2017 | Bernard | G01L 19/086 |
| 2017/0089692 A1 * | 3/2017 | Chattopadhyay | G01B 11/26 |
| 2017/0169593 A1 * | 6/2017 | Leigh | G06T 7/0042 |
| 2018/0005044 A1 * | 1/2018 | Olson | G06K 9/00771 |

OTHER PUBLICATIONS

International Search Report and the Written Opinion of the International Searching Authority, dated Apr. 5, 2018, in corresponding International Application No. PCT/US2018/020108, 9 pages.

* cited by examiner

SYSTEMS AND METHODS FOR EVALUATING READINGS OF GAUGE DIALS

CROSS-REFERENCE TO RELATED APPLICATIONS

This application claims a benefit of priority to U.S. Provisional Application Ser. No. 62/467,505 filed on Mar. 6, 2017, and incorporated by reference herein in its entirety for all purposes.

TECHNICAL FIELD

Generally, this disclosure relates to image processing. More particularly, this disclosure relates to evaluating readings of gauge dials.

BACKGROUND

In this disclosure, where a document, an act, and/or an item of knowledge is referred to and/or discussed, then such reference and/or discussion is not an admission that the document, the act, and/or the item of knowledge and/or any combination thereof was at a priority date, publicly available, known to a public, part of common general knowledge, and/or otherwise constitutes any prior art under any applicable statutory provisions; and/or is known to be relevant to any attempt to solve any problem with which this disclosure is concerned with. Further, nothing is disclaimed.

An analog gauge, such as a manometer, a thermometer, or others, can obtain a reading of a characteristic, such as a pressure, a temperature, or others, of a fluid source, such as an oil well, a gas pipeline, or others. The analog gauge can present this reading via a dial indicator.

In order to maintain the fluid source, there are situations when a manual inspection of the analog gauge is desired, such as to report the reading from the dial indicator, to repair the dial indicator, or others. However, performing the manual inspection can be costly, time-consuming, laborious, and dangerous. For example, various weather conditions, such as rain, snow, or others, can make the manual inspection difficult. Likewise, various hazardous environments, such as a fluid leak, a radiation leak, or others, can also make the manual inspection difficult. Similarly, if the analog gauge is positioned in a hard-to-access area or if there are many analog gauges, especially in different locales from each other, then the manual inspection becomes even more difficult.

SUMMARY

This disclosure attempts to address at least one of the above inefficiencies. However, this disclosure can prove useful to other technical areas. Therefore, various claims recited below should not be construed as necessarily limited to addressing any of the above inefficiencies.

In an embodiment, there is provided a method comprising: identifying, by a processor, a gauge dial pattern in a first file based on a gauge dial template in a second file; identifying, by the processor, a needle pattern in the first file; generating, by the processor, a line pattern that approximates the needle pattern; determining, by the processor, a deflection angle of the needle pattern with respect to the gauge dial pattern based on the line pattern; converting, by the processor, the deflection angle into a reading of the gauge dial pattern based on the gauge dial template; and taking, by the processor, an action based on the reading.

In another embodiment, there is provided a system comprising: a server storing a set of instructions to perform a method comprising: identifying, by a processor, a gauge dial pattern in a first file based on a gauge dial template in a second file; identifying, by the processor, a needle pattern in the first file; generating, by the processor, a line pattern that approximates the needle pattern; determining, by the processor, a deflection angle of the needle pattern with respect to the gauge dial pattern based on the line pattern; converting, by the processor, the deflection angle into a reading of the gauge dial pattern based on the gauge dial template; and taking, by the processor, an action based on the reading.

This disclosure is embodied in various forms illustrated in a set of accompanying illustrative drawings. Note that variations are contemplated as being a part of this disclosure, limited only by a scope of various claims recited below.

BRIEF DESCRIPTION OF DRAWINGS

The set of accompanying illustrative drawings shows various example embodiments of this disclosure. Such drawings are not to be construed as necessarily limiting this disclosure. Like numbers and/or similar numbering scheme can refer to like and/or similar elements throughout.

DETAILED DESCRIPTION

This disclosure is now described more fully with reference to the set of accompanying drawings, in which some example embodiments of this disclosure are shown. This disclosure may, however, be embodied in many different forms and should not be construed as necessarily being limited to the example embodiments disclosed herein. Rather, these example embodiments are provided so that this disclosure is thorough and complete, and fully conveys various concepts of this disclosure to skilled artisans.

Generally, this disclosure enables an automatic recognition of a reading of a gauge. In particular, a patrol tour is scheduled for a camera, such as a pan-tilt-zoom (PTZ) camera. The patrol tour enables the camera to optically tour a set of gauges such that the camera is able to capture a set of images depicting the set of gauges. When the camera is not capturing the set of images depicting the set of gauges, then the camera is used for surveillance. During the patrol tour, for at least one of the gauges, the camera captures an image of that gauge, where that gauge includes a dial and a needle arranged in accordance with a reading of that gauge. The image is automatically saved into a file and the file is sent to a remote server for performing a recognition process thereon, such as determining the reading based on a needleless gauge template. The file is named with a name that includes a gauge identifier, a date stamp, and a time stamp for the image. Once the reading is determined, an action can be taken, such as requesting a task from a computational resource, saving the reading into a database or another data structure. For example, if requested, then the database can generate a report including the reading for a specified time period.

Figure 1:
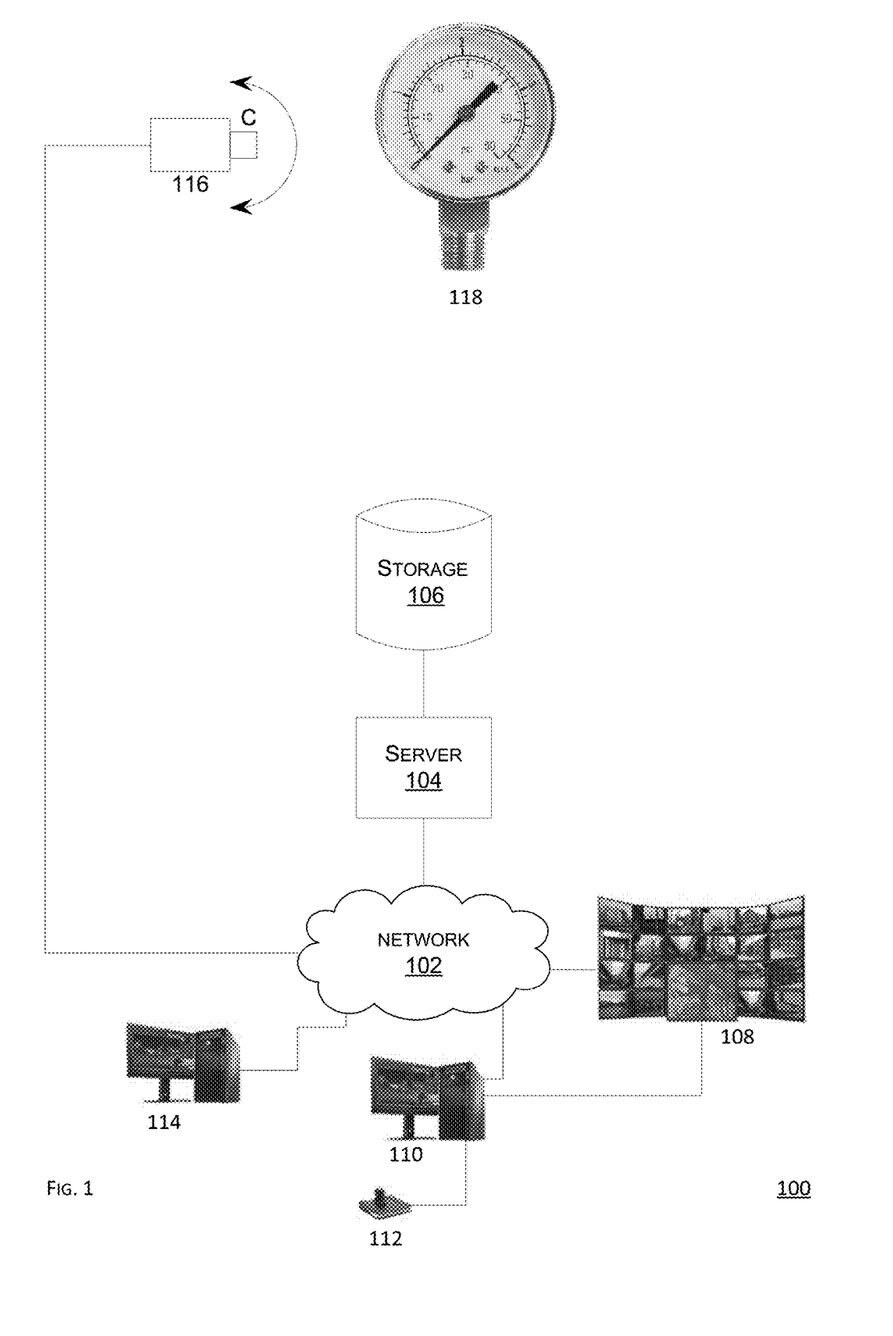
FIG. 1 shows a schematic diagram of an example embodiment of a network topology according to this disclosure.

FIG. 1 shows a schematic diagram of an example embodiment of a network topology according to this disclosure. A network topology 100 comprises a network 102, a server 104, a storage 106, a video wall 108, an administrator workstation 110, a joystick 112, an operator workstation 114, and a camera 116. The server 104 is in signal communication, whether wired or wireless, whether direct or indirect, with the network 102. The storage 106 is in signal communication, whether wired or wireless, whether direct or indirect, with the server 104. The video wall 108 is in signal communication, whether wired or wireless, whether direct or indirect, with the network 102 and the workstation 110. The workstation 110 is in signal communication, whether wired or wireless, whether direct or indirect, with the network 102, the video wall 108, and the joystick 112. The joystick 112 is in signal communication, whether wired or wireless, whether direct or indirect, with the workstation 110. The workstation 114 is in signal communication, whether wired or wireless, whether direct or indirect, with the network 102. The camera 116 is in signal communication, whether wired or wireless, whether direct or indirect, with the network 102. As such, the server 102, the video wall 108, the workstation 110, the workstation 114, and the camera 116 can signally communicate with each other over the network 102, whether directly or indirectly. Also, FIG. 1 shows a gauge 118 which includes a dial and a needle. The camera 116 is positioned to capture an image, such as a photo or a video, of the dial and the needle.

In particular, the network 102 includes a plurality of nodes that allow for sharing of resources or information. The network 102 can be wired or wireless. For example, the network 102 can be a local area network (LAN), a wide area network (WAN), a cellular network, or others.

The server 104 runs an operating system, such as MacOS®, Windows®, or others, and an application, such as a video analytics application, on the operating system. The server 104 can include and/or be coupled to, whether directly and/or indirectly, an input device, such as a mouse, a keyboard, a camera, whether forward-facing and/or back-facing, an accelerometer, a touchscreen, a biometric reader, a clicker, a microphone, or any other suitable input device. The server 104 can include and/or be coupled to, whether directly and/or indirectly, an output device, such as a display, a speaker, a headphone, a printer, or any other suitable output device. In some embodiments, the input device and the output device can be embodied in one unit, such as a touch-enabled display, which can be haptic.

The storage 106 can comprise a storage medium, such as a data structure, a database, or others. For example, the database can include a relational database, an in-memory database, or others, which can store data, such as in a record field, and allow access to such data, whether in a raw state, a formatted state, an organized stated, or any other accessible state. For example, such data can include an image file, a sound file, an alphanumeric text string, or any other data. The storage 106 is configured for various data Input/Output (I/O) operations, including reading, writing, editing, modifying, deleting, updating, searching, selecting, merging, sorting, encrypting/decrypting, de-duplicating, or others. In some embodiments, the storage 106 can be unitary with the server 102.

The video wall 108 contains a multi-display array, which includes a plurality of displays, such as computer monitors, video projectors, or television sets, tiled or tessellated together contiguously or overlapped, in order to form a single aggregate display. For example, at least one of the displays can comprise a liquid crystal display (LCD), a plasma display, a light emitting diode (LED) display, or others, whether identical to or different from each other in display technology, shape, or size. The displays are positioned immediately adjacent to each other to reduce a mullion. The displays include logic, whether hardware-based or software-based, and mounting/coupling hardware to position displays adjacent to each other, along with connections to daisy chain power, video, and command signals therebetween. For example, a command signal may power some or all displays in the video wall 108 on or off, or calibrate a brightness or contrast or other visual characteristic of a single display, such as after a bulb replacement.

The workstation 110 runs an operating system, such as MacOS®, Windows®, or others, and an application, such as an administrator application, on the operating system. The workstation 110 can include and/or be coupled to, whether directly and/or indirectly, an input device, such as a mouse, a keyboard, a camera, whether forward-facing and/or back-facing, an accelerometer, a touchscreen, a biometric reader, a clicker, a microphone, or any other suitable input device. The workstation 110 can include and/or be coupled to, whether directly and/or indirectly, an output device, such as a display, a speaker, a headphone, a printer, or any other suitable output device. In some embodiments, the input device and the output device can be embodied in one unit, such as a touch-enabled display, which can be haptic. As such, the application presents an administrator graphical user interface (GUI) configured to depict a page, where the page can include a visual element, such as a menu, enabling a control of an aspect of the topology 100, such as any hardware, software, or any other logic or functionality. For example, the workstation 110 can be configured to control the network 102, the server 104, the video wall 108, the camera 116, or others.

The joystick 112 comprises an input device including a stick, a base, and a logic, whether hardware-based or software-based, for reporting an operation of the stick with respect to the base. The stick cantileveredly pivots on the base and the logic reports an angle or direction of the stick to a device coupled to the joystick 112, such as the workstation 110. The stick or the base may include a button, a switch, or a lever. The joystick 112 may receive power from the device coupled thereto, such as the workstation 110, or be battery powered. Alternatively or additionally, the joystick 112 may comprise an analog stick, a miniature finger-operated joystick, a trigger, a button, a gamepad or a touch-enabled interface, such a touchscreen, such as a mobile phone or a tablet. Alternatively or additionally, the joystick 112 may comprise a feedback functionality or device, such as via vibration or haptic output.

The workstation 114 runs an operating system, such as MacOS®, Windows®, or others, and an application, such as an operator application, on the operating system. The workstation 114 can include and/or be coupled to, whether directly and/or indirectly, an input device, such as a mouse, a keyboard, a camera, whether forward-facing and/or back-facing, an accelerometer, a touchscreen, a biometric reader, a clicker, a microphone, or any other suitable input device. The workstation 114 can include and/or be coupled to, whether directly and/or indirectly, an output device, such as a display, a speaker, a headphone, a printer, or any other suitable output device. In some embodiments, the input device and the output device can be embodied in one unit, such as a touch-enabled display, which can be haptic. As such, the application presents an operator GUI configured to depict a page, where the page can include a visual element, such as a menu, enabling an access to an image from the camera 116, whether directly or indirectly, such as from the storage 106, the camera 116, the server 104, or others. For example, such access can comprise reading, writing, deleting, or others. The workstation 114 can be configured to receive an access to any information obtained, extracted, associated, or linked from the image, such as via the server 104, the storage 106, or others. For example, such access can comprise reading, writing, deleting, or others. In some embodiments, the workstation 110 and the workstation 114 are a single workstation.

The camera 116 includes an optical instrument for capturing and recording images, which may be stored locally, transmitted to another location, or both. The images may be individual still photographs or sequences of images constituting videos. The images can be analog or digital. The camera 116 can comprise any type of lens, such as convex, concave, fisheye, or others. The camera 116 can comprise any focal length, such as wide angle or standard. The camera 116 can comprise a flash illumination output device. The camera 116 can comprise an infrared illumination output device. The camera 116 is powered via mains electricity, such as via a power cable or a data cable. In some embodiments, the camera 116 is powered via at least one of an onboard rechargeable battery, such as a lithium-ion battery, which may be charged via an onboard renewable energy source, such as a photovoltaic cell, a wind turbine, or a hydropower turbine. The camera 116 can be configured for geo-tagging, such as via modifying an image file with geolocation/coordinates data. The camera 116 can include or be coupled to a microphone. The camera 116 can be a PTZ camera, which may be a virtual PTZ camera. The camera 116 can be configured for a name-stamping, date-stamping, or time-stamping the image, such as what date or time the image was captured or naming the image with a naming convention, as pre-programmed in advance.

The gauge 118 obtains a reading of a characteristic of a mechanical subject matter, an electrical subject matter, a chemical subject matter, or any other physical or non-physical subject matter, such as a fluid, whether a liquid or a gas, a solid, an energy, a particle, a time, a sound, or others. For example, the characteristic can include a volume, a pressure, a weight, a temperature, a voltage, a speed, a frequency, an angle, a thickness, a length, a height, a depth, a run-out, an orientation, a deflection, or others. The gauge 118 includes a dial indicator having a dial display, which is defined via the needle and the dial, as noted above. In such configuration, the needle points to a graduation, whether positive or negative, in a circular, arcuate, or linear array about the dial, whether the dial is balanced or continuous. For example, the needle can move, whether clockwise or counterclockwise, with respect to the dial in a calibrated manner or the dial can move, whether clockwise or counterclockwise, with respect to the needle in a calibrated manner. Note that the gauge 118 can include other indicator types, such as a cantilevered pointer. Likewise, note that although the gauge 118 is analog, the gauge 118 can be digital, such as via the gauge 118 electronically displaying the dial and the needle. Similarly, note that the gauge 118 can be used in any context, such as a calibration setting, a manufacturing setting, a vehicle setting, whether land, aerial, marine, or space, a health setting, a military setting, a laboratory setting, a fluid setting, a probe setting, or any other setting employing any subject matter exemplified above. Also, note that the gauge 118 can include a clock. Additionally, note that the gauge 118 can include a plurality of indicators, whether similar or dissimilar to each other in operation, such as a plurality of dial indicators. Moreover, note that the dial or the needle may be photoluminescent, such as via exhibiting a phosphorescence for a darkness visibility, such as during a nighttime. Some examples of the gauge 118 include a manometer, a thermometer, a vehicle dashboard panel, a clock, a caliper, a load cell, a weight scale, or any other gauge of any type in any context.

In one mode of operation, an administrator operates the joystick 112 to provide an input to the workstation 110 such that the workstation 110 instructs the camera 116, such as a PTZ camera, over the network 102 to capture an image of the dial indicator of the gauge 118, such as a gauge dial having a needle thereon, any of which may be photoluminescent. For example, such control may include orientation, panning, tilting, zooming, moving, snapshot capture, functionality activation, turn on/off, or others. For example, the server 104 can associate a field-of-view position of the camera 116 with the gauge dial, such as when the camera 116 movably or optically patrols along a predefined path to capture the image of the dial indicator of the gauge 118, while performing a surveillance on the predefined path when not capturing the image and capturing other imagery at other field-of-views, such as those that avoid the gauge dial of the gauge 118. Subsequently, the camera 116 captures the image of the dial indicator of the gauge 118 and can stamp/rename the image with a gauge identifier/date/time with that gauge identifier/date/time, and sends the image to the server 104 over the network 102.

In response, the server 104 can perform a functionality, whether in real-time or on-demand, via an application, a function, a module, a script, a circuit, a device, or any other logic, whether hardware-based or software-based, running, coupled, or otherwise accessible to the server 104. The functionality includes identifying a gauge dial pattern in a first file, such as the image, based on a gauge dial template in a second file, which may be stored on the server 104 or retrievable from the storage 106. The gauge dial template is based on the gauge dial. The gauge dial pattern depicts the gauge dial and the needle pattern depicts the needle. The gauge dial template may include a needleless gauge dial pattern, a lower bound gauge dial coordinate, an upper bound gauge dial coordinate, a lower bound value corresponding to the lower bound gauge dial coordinate, an upper bound value corresponding to the upper bound gauge dial coordinate, and a coordinates set of a rotation axis corresponding to the needle pattern. The server 104 may identify a needle pattern in the first file, such as via binarizing a grayscale image obtained from on an absolute difference between the gauge dial pattern and the gauge dial template and generate a line pattern that approximates the needle pattern, such as via a least squares method. The server 104 may determine a deflection angle of the needle pattern with respect to the gauge dial pattern based on the line pattern and the binarizing, convert the deflection angle into a reading of the gauge dial pattern based on the gauge dial template and a set of dial bounds coordinates and a set of corresponding values, and a set of coordinates of a needle rotation axis, and then take an action based on the reading. For example, the action can include presenting the reading over the gauge dial pattern in the image, such as via displayable augmentation of the image without modifying the image or writing into the image. Other examples can include report or write the reading into a data structure, such as a spreadsheet. Note that if there is a plurality of gauge dial patterns in the image, such as within a single gauge 118, then the server 108 can select the gauge dial template from a plurality of gauge dial templates, such as stored on the server 104 or the storage 106, based on a set of criteria, such as prior frequency use history, analytics, heuristics, random selection, artificial intelligence, pre-programming, a set of manual user inputs, or others. As such, an operator operating the workstation 114 can access the reading in the server 104 or the storage 106, such as when exported into a data structure or presented over the gauge dial pattern in the image.

Figure 2:
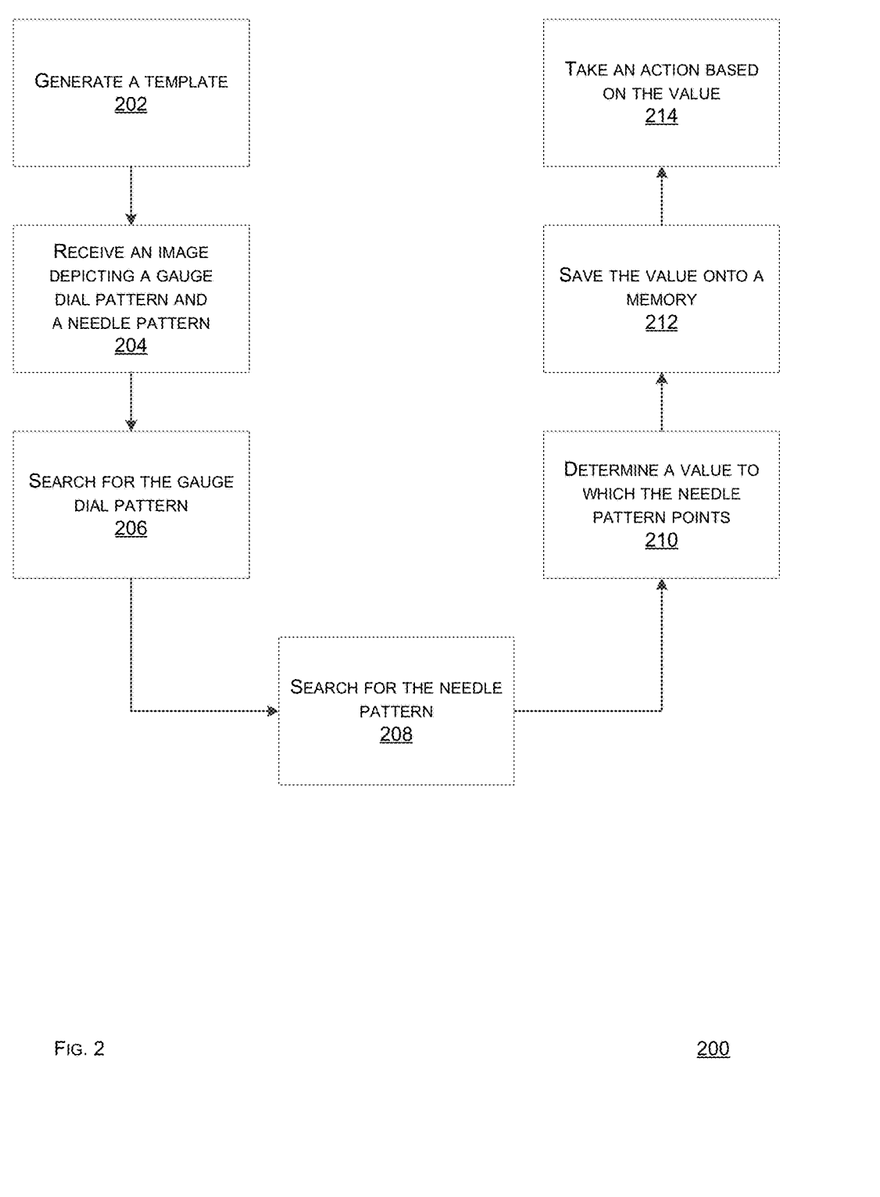
FIG. 2 shows a flowchart of an example embodiment of a method to determine a reading of a gauge and to act based on the reading according to this disclosure.

FIG. 2 shows a flowchart of an example embodiment of a method to determine a reading of a gauge and to act based on the reading according to this disclosure. A method 200 includes a set of block 202-214, which enable an automated reading of the gauge 118 and an automated action based on the automated reading. The method 200 is performed using the topology 100 and the gauge 118, as shown in FIG. 1.

Figure 4:
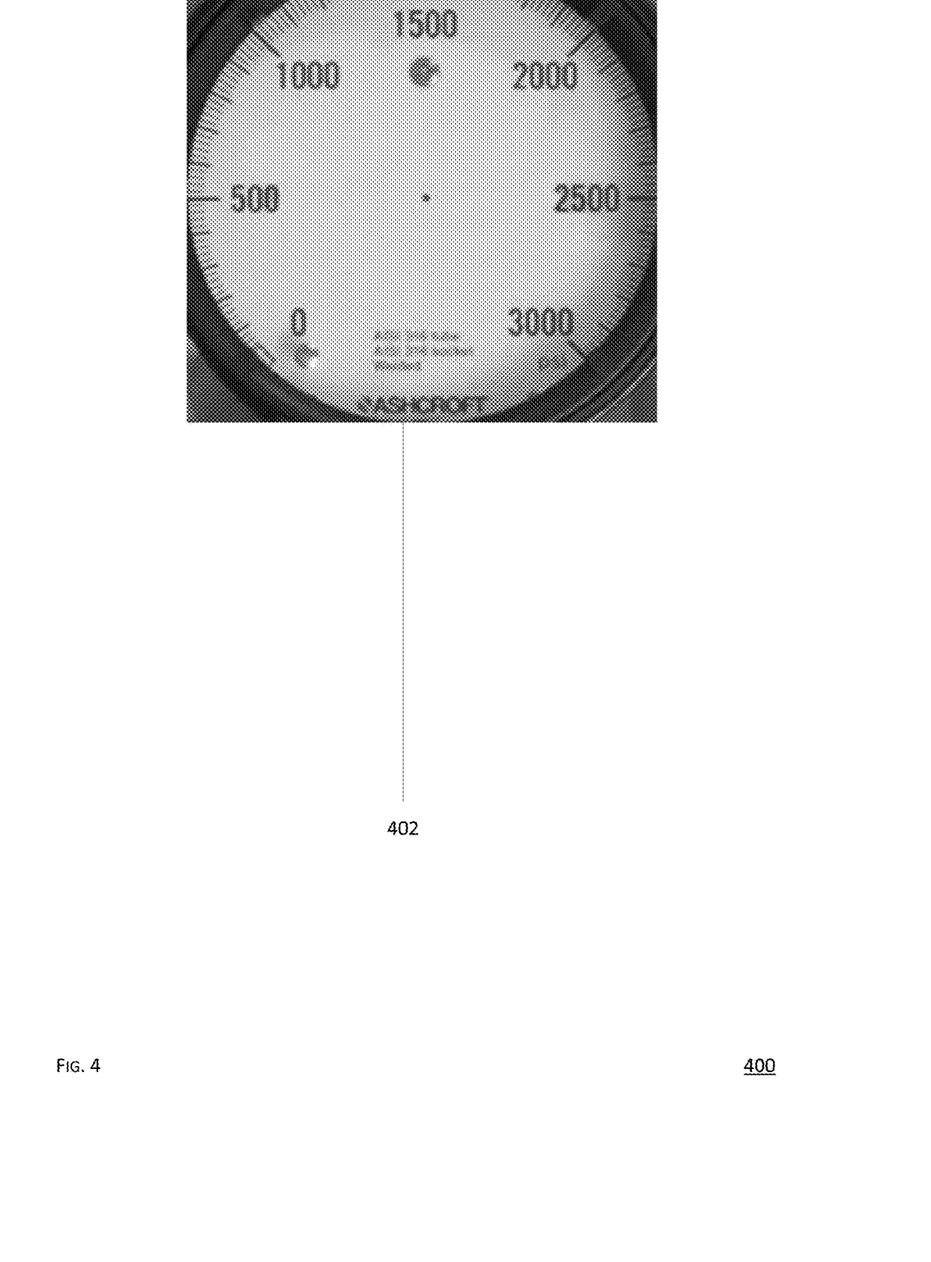
FIG. 4 shows a schematic diagram of an example embodiment of a gauge dial template according to this disclosure.

In the block 202, a gauge dial template is generated, such as via the workstation 110 or the workstation 114. For example, the gauge dial template is written into a data structure, such as a file. As shown in FIG. 4, the gauge dial template includes an image depicting a dial pattern without a projective transformation, such as when an optical axis of a camera is positioned perpendicular to a dial surface of the gauge 118 when capturing the dial pattern, and without a needle pattern, such as when the needle is removed when an optical axis of a camera is positioned perpendicular to the dial surface of the gauge 118 when capturing the dial pattern. Also, the gauge dial template includes a set of calibrating parameters, such as a lower bound graduated dial scale coordinate, an upper bound graduated dial scale coordinate, a lower bound graduated dial scale value, an upper bound graduated dial scale value, a set of coordinates of a rotation axis of the needle of the gauge 118. Upon generation, the gauge dial template is uploaded to the server 104 over the network 102. Upon request, the server 104 may initialize a recognition module via searching for a set of characteristic points on the gauge dial template, such as via an Oriented FAST and rotated BRIEF (ORB) technique, and determining a set of descriptors corresponding to the set of the characteristic points, such as via a Fast Retina Keypoint (FREAK) technique.

Figure 3:
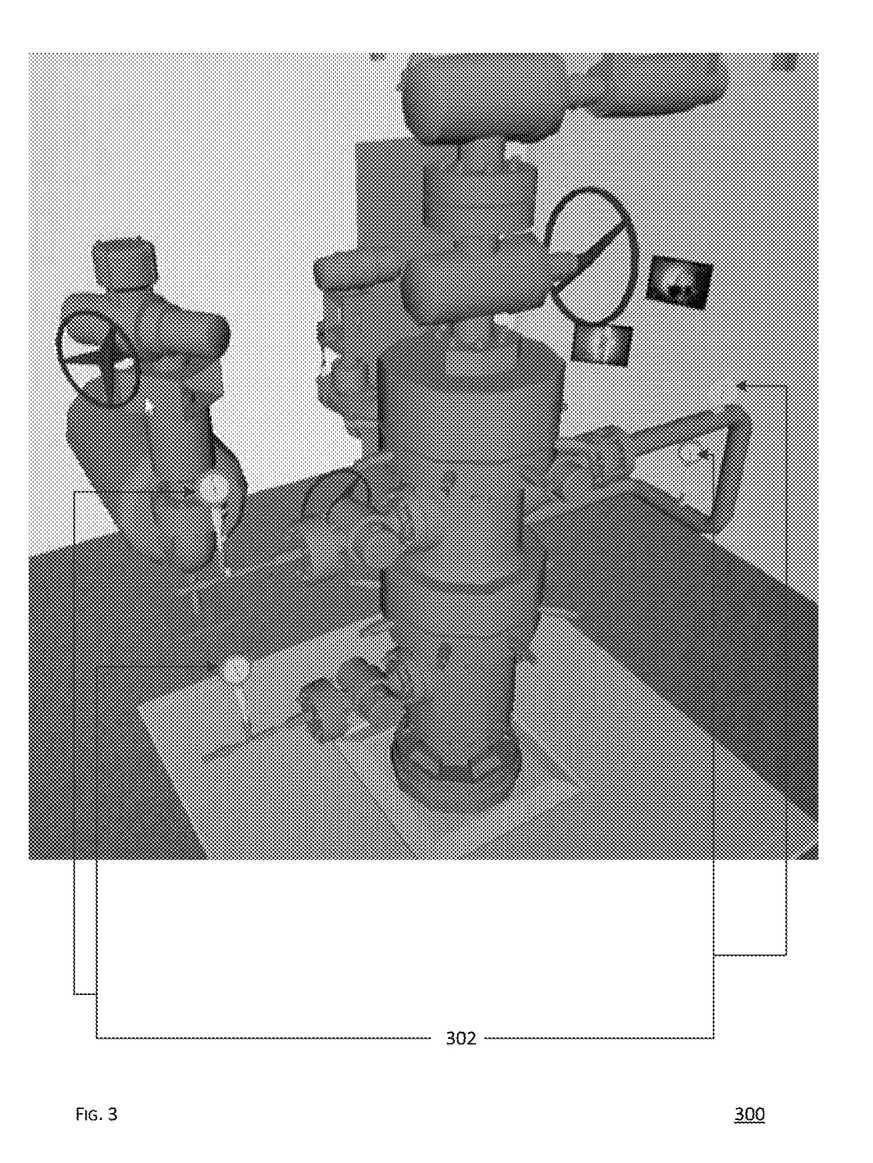
FIG. 3 shows a schematic diagram of an example environment of a fluid conduction environment equipped with a plurality of gauges according to this disclosure.

In the block 204, an image depicting a gauge dial pattern and a needle pattern is received, such as via the server 104. The image originates from the camera 116. The image can be stored in a data structure, such as a file. The gauge dial pattern depicts the gauge dial of the gauge 118 and the needle pattern depicts the needle of the gauge 118. For example, the image can be received via the server 104 over the network 102 when the camera 116 is on a scheduled optical patrol tour about a set of gauges 118 and the camera 116 captures the image when the camera 116 is oriented or moved into a specific position corresponding to a specific gauge 118 or zoomed into a specific zone corresponding to a specific gauge 118. Before sending from the camera 116 or upon receiving via the server 104, the image or the data structure storing the image can name, such as via stamping, the image or the data structure storing the image with a gauge identifier associated with the gauge dial or with a date string or a time string associated with the PTZ camera capturing the image. One example of the image is schematically depicted in FIG. 3.

In the block 206, the image is searched for the gauge dial pattern, such as via the server 104. The searching can be upon receipt of the image or upon request, such as via the operator of the workstation 114. Since the image may not ideally depict the gauge dial pattern, such as due to a projective transformation, which may be due to a disorientation of the camera 116 or the gauge 118, the searching entails checking for a projective transformation or accommodating for a projective transformation. For example, such accommodation can include a search for a set of characteristic points in the image, such as via searching for a set of ORB features through an ORB technique, and determining a set of descriptors corresponding thereto, such as via a FREAK technique. Further, such accommodation can include associating, such as via matching or mapping, a set of descriptors for the gauge dial template, as noted above, with a set of descriptors of the image, as noted above, such as via a Brute-Force matching technique, a Cross-Match filtering technique, and a K-nearest-neighbors (KNN)-matching ratio test technique. Moreover, such accommodation can include a search for a perspective transformation, such via employing a method of evaluating a set of image parameters, such as a random sample consensus (RANSAC) technique, and applying the perspective transformation to the image. The associating, as noted above, and the searching for the perspective transformation, as noted above, are iterated or repeated, such as at least two times, for a transformation of the image in order to receive a more refined perspective transformation, which should minimize the projective transformation. Resultantly, a cropped image is formed or otherwise obtained from the image received from the camera 116, where the cropped image contains a corrected perspective distortion (corrected image), which is compatible with the gauge dial template.

In the block 208, the corrected image is searched for the needle pattern, such as via the server 104. Such search can include various techniques. For example, in order to minimize an influence or an impact of a background of each of the gauge dial template and the corrected image, an area corresponding to the dial is masked and remaining pixels of each of the gauge dial template and the corrected image are ignored. Further, for each of the gauge dial template and the corrected image, a Gaussian blur and a mathematical morphology expansion, such as a morphological dilation, are performed, after which an absolute difference between the gauge dial template and the corrected image is determined. Subsequently, a grayscale image is formed, which is then binarized. By combining operations of the morphological expansion, such as dilation, with the Gaussian blur, and with a contour/outline search, an identification of a contour/outline of the needle pattern.

In the block 210, a value to which the needle pattern points is determined, such as via the server 104. Such determination can include various techniques. For example, using a technique of least squares, a search for a rectilinear line pattern is performed, where the rectilinear line pattern approximates the contour/outline of the needle pattern. As such, using the binarized grayscale image and the rectilinear line pattern, an angle of deflection of the needle pattern is determined. Subsequently, using the set of set of calibrating parameters of the gauge dial template, the angle of deflection is converted into a reading of the gauge 118. The reading can include an alphanumerical, a symbolic, or a color value.

In the block 210, the value is saved, such as via the server 104, onto a memory, such as the storage 106.

In the block 212, an action is taken based on the value, such as via the server 104. The action can be of any type, such as generating an instruction/message, sending an instruction/message, writing the value into a data structure, or others. The action can be taken via any component of the topology 100. For example, the action can include presenting the reading over the gauge dial pattern in the image or the corrected image. For example, the action can include exporting the reading into a data structure, such as a database, or generating or updating a report with the reading.

In some embodiments, the gauge dial or the needle of the gauge 118 is photoluminescent, such as via exhibiting phosphorescence, and as such, the blocks 202-210 accommodate for such configuration.

In some embodiments, the image depicts a plurality of gauge dial patterns within a single gauge 118. Accordingly, the gauge dial template is selected from a plurality of gauge dial templates based on a set of criteria, such as prior frequency use history, analytics, heuristics, random selection, artificial intelligence, pre-programming, a set of manual user inputs, or others.

FIG. 3 shows a schematic diagram of an example environment of a fluid conduction environment equipped with a plurality of gauges according to this disclosure. A fluid conduction environment 300, such as an oil well, includes a plurality of gauges 302, each of which can be similar to the gauge 118. For example, the camera 116 can be programmed with a scheduled patrol tour where along a plurality of physical points or time durations during the tour, the camera 116 captures a plurality of images of the gauges 302, in any image-to-gauge correspondence, while on a surveillance of this locale when not capturing the images of the gauges 302, which enables an efficient use of the camera 116. However, note that this disclosure is not limited to the environment 300. Rather, any gauge dial with any needle in any environment can be used.

FIG. 4 shows a schematic diagram of an example embodiment of a gauge dial template according to this disclosure. A gauge dial template 400 contains a gauge dial pattern 402, as noted above in context of FIGS. 1 and 2.

Figure 5A:
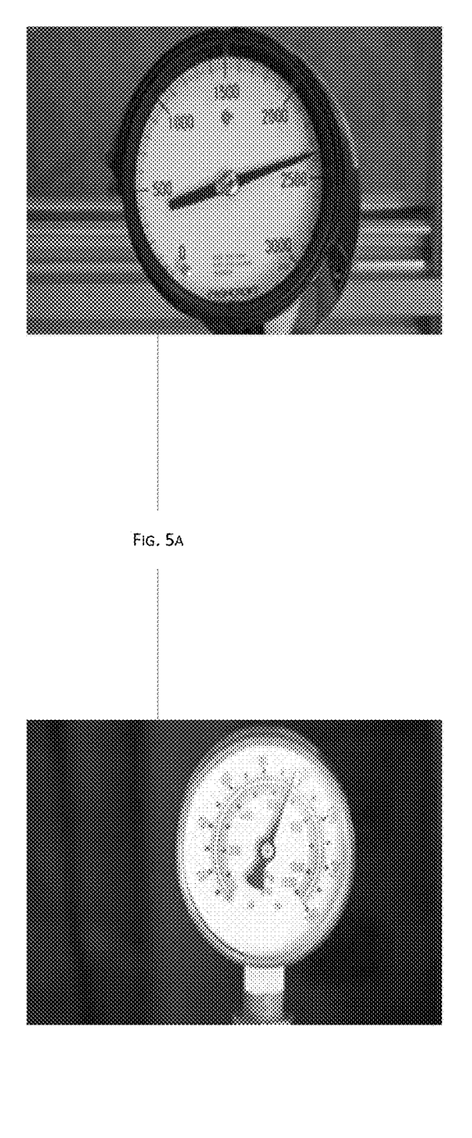
FIGS. 5a and 5b show a plurality of schematic diagrams of a plurality of example embodiments of a plurality of gauge readings from a plurality of gauges according to this disclosure.
Figure 5B:
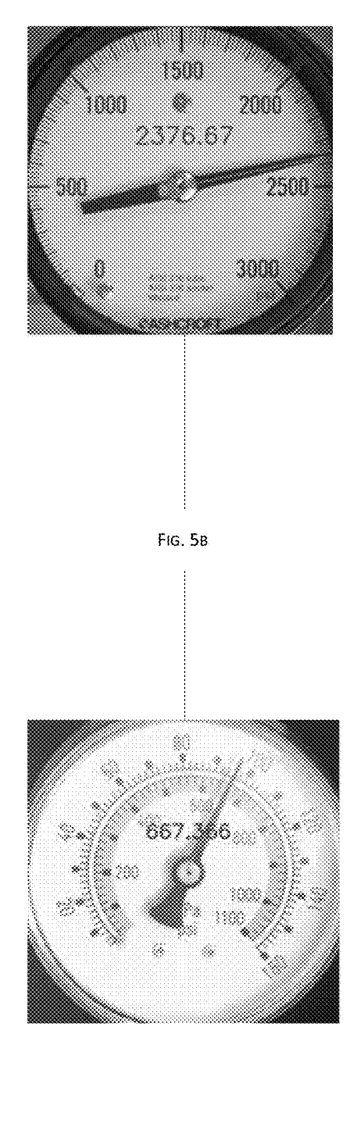

FIGS. 5a and 5b show a plurality of schematic diagrams of a plurality of example embodiments of a plurality of gauge readings from a plurality of gauges according to this disclosure. As shown in FIG. 5a, a pair of images captured via the camera 116 depicts a pair of gauge dial patterns presenting a pair of readings, as noted above with respect to the block 204. As shown in FIG. 5b, the pair of images has been processed, as noted above with respect to the blocks 206-212, including an image normalization process and presenting the rectilinear line (green) over the needle pattern, and a pair of alphanumeric value strings corresponding to the pair of readings is displayed over the pair of dial patterns in a visually distinct manner, such as via a red font. Although the pair of alphanumeric value strings is presented as enclosed within the dial patterns, other ways of presenting the pair of alphanumeric value strings are possible, such as external to the dial patterns, longitudinally or centrally over the needle, or others. Likewise, the visually distinct manner can differ, such as in font color, font size, value system, or others. Similarly, the readings can be presented differently, such as in a non-alphanumeric manner, such as a symbolic manner, a color scale manner, or others. Note that the gauge can present the dial or the needle in an analog or digital manner.

In some embodiments, the operator of the workstation 114 or the administrator of the workstation 110 can set an action setting, such as an alarm output or others, for a graduated dial scale of the gauge 118, such as via saving the action setting in the server 104 or the storage 106. The action setting can include a range defined via a lower boundary value indicator and an upper boundary value indicator. For example, the lower boundary value indicator and the upper boundary value indicator can be displayed as a needle pattern or a clock hand pattern on the gauge dial template. Such needle pattern or the clock hand pattern can be visually distinct, such as via color, shape, size, or others, between each other or the gauge dial template or from the needle pattern obtained from the image, as noted above with respect to the block 204. Likewise, the range can be visually distinct from remaining graduated dial scale, such as via color filling, or others. As such, using the reading, as obtained via the method 200, if the reading is within the range or outside the range, as evaluated via the server 104, then the server 104 can request that an action in accordance with the action setting can be taken, such as an alarm message is generated and sent or an alarm device, such as a bell, a siren, or a horn, is activated. Note that the alarm device can output in other ways, such as via an illumination, a vibration, or others, whether analog or digital.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening PO controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method comprising:
    identifying, by a processor, a gauge dial pattern in a first file based on a gauge dial template in a second file, wherein the gauge dial template contains a needleless gauge dial pattern and a set of calibrating parameters;
    identifying, by the processor, a needle pattern in the first file;
    generating, by the processor, a line pattern that approximates the needle pattern;
    determining, by the processor, a deflection angle of the needle pattern with respect to the gauge dial pattern based on the line pattern;
    converting, by the processor, the deflection angle into a reading of the gauge dial pattern based on the gauge dial template including the needleless gauge dial pattern and the set of calibrating parameters;
    causing, by the processor, the reading to be presented over the gauge dial pattern via a display; and
    causing, by the processor, an alarm to be output via an alarm device based on the reading being external to a predefined range.

2. The method of claim 1, wherein the set of calibrating parameters contains a lower bound gauge dial coordinate and an upper bound gauge dial coordinate.

3. The method of claim 1, wherein the set of calibrating parameters contains a lower bound value corresponding to the lower bound gauge dial coordinate and an upper bound value corresponding to the upper bound gauge dial coordinate.

4. The method of claim 1, wherein the set of calibrating parameters contains a coordinates set of a rotation axis corresponding to the needle pattern.

5. The method of claim 1, further comprising:
    associating, by the processor, a field-of-view position of a pan-tilt-zoom (PTZ) camera with a gauge dial having a needle thereon, wherein the gauge dial template is based on the gauge dial, wherein the gauge dial pattern depicts the gauge dial and the needle pattern depicts the needle;
    receiving, by the processor, an image from the PTZ camera based on the PTZ camera being moved into the field-of-view position, wherein the image depicts the gauge dial pattern and the needle pattern.

6. The method of claim 5, wherein the field-of-view position is a first field-of-view position, wherein the image is a first image, and further comprising:
    receiving, by the processor, a second image from the PTZ camera based on the PTZ camera being moved into a second field-of-view position that avoids the gauge dial.

7. The method of claim 5, further comprising:
    naming, by the processor, the first file with a gauge identifier associated with the gauge dial, wherein the first file contains the image.

8. The method of claim 5, further comprising:
    naming, by the processor, the first file with at least one of a date string or a time string associated with the PTZ camera capturing the image, wherein the first file contains the image.

9. The method of claim 1, further comprising:
    binarizing, by the processor, a grayscale image obtained from on an absolute difference between the gauge dial pattern and the gauge dial template, wherein the deflection angle is determined based on the line pattern and the binarizing.

10. The method of claim 9, wherein the line pattern is generated via a least squares method.

11. The method of claim 1, wherein the gauge dial pattern is captured via a virtual PTZ camera.

12. The method of claim 1, wherein the reading is presented over the gauge dial pattern in a visually distinct manner.

13. The method of claim 1, wherein the gauge dial pattern includes a set of graduated photoluminescent marking patterns.

14. The method of claim 1, further comprising:
receiving, by the processor, the first file depicting a plurality of gauge dial patterns within a single gauge, wherein the patterns include the gauge dial pattern;
selecting, by the processor, the gauge dial template from a plurality of gauge dial templates based on a set of criteria, wherein the identifying the gauge dial pattern in the first file is based on the selecting.

15. A system comprising:
a server storing a set of instructions to perform a method comprising:
identifying, by a processor, a gauge dial pattern in a first file based on a gauge dial template in a second file, wherein the gauge dial template contains a needleless gauge dial pattern and a set of calibrating parameters;
identifying, by the processor, a needle pattern in the first file;
generating, by the processor, a line pattern that approximates the needle pattern;
determining, by the processor, a deflection angle of the needle pattern with respect to the gauge dial pattern based on the line pattern;
converting, by the processor, the deflection angle into a reading of the gauge dial pattern based on the gauge dial template including the needleless gauge dial pattern and the set of calibrating parameters;
causing, by the processor, the reading to be presented over the gauge dial pattern via a display; and
causing, by the processor, an alarm to be output via an alarm device based on the reading being external to a predefined range.

16. The system of claim 15, wherein the set of calibrating parameters contains a lower bound gauge dial coordinate, an upper bound gauge dial coordinate, a lower bound value corresponding to the lower bound gauge dial coordinate, an upper bound value corresponding to the upper bound gauge dial coordinate, and a coordinates set of a rotation axis corresponding to the needle pattern.

17. The system of claim 15, wherein the method further comprising:
associating, by the processor, a field-of-view position of a pan-tilt-zoom (PTZ) camera with a gauge dial having a needle thereon, wherein the gauge dial template is based on the gauge dial, wherein the gauge dial pattern depicts the gauge dial and the needle pattern depicts the needle;
receiving, by the processor, an image from the PTZ camera based on the PTZ camera being moved into the field-of-view position, wherein the image depicts the gauge dial pattern and the needle pattern.

18. The system of claim 17, wherein the method further comprising:
naming, by the processor, the first file with a gauge identifier associated with the gauge dial, wherein the first file contains the image; and
naming, by the processor, the first file with at least one of a date string or a time string associated with the PTZ camera capturing the image.

19. The system of claim 15, wherein the method further comprising:
binarizing, by the processor, a grayscale image obtained from on an absolute difference between the gauge dial pattern and the gauge dial template, wherein the deflection angle is determined based on the line pattern and the binarizing.

20. The system of claim 15, wherein the reading is presented over the gauge dial pattern in a visually distinct manner.

* * * * *